US007771680B2

(12) United States Patent
Gordienko

(10) Patent No.: US 7,771,680 B2
(45) Date of Patent: Aug. 10, 2010

(54) PROCESS FOR THE PRODUCTION OF TITANIUM DIOXIDE USING AQUEOUS FLUORIDE

(75) Inventor: Pavel S. Gordienko, Vladivostok (RU)

(73) Assignee: Breton SpA, Castello di Godego (IT)

( * ) Notice: Subject to any disclaimer, the term of this patent is extended or adjusted under 35 U.S.C. 154(b) by 73 days.

(21) Appl. No.: 11/813,919

(22) PCT Filed: Jan. 16, 2006

(86) PCT No.: PCT/EP2006/050214

§ 371 (c)(1),
(2), (4) Date: Jul. 13, 2007

(87) PCT Pub. No.: WO2006/077203

PCT Pub. Date: Jul. 27, 2006

(65) Prior Publication Data

US 2008/0187475 A1 Aug. 7, 2008

(30) Foreign Application Priority Data

Jan. 24, 2005 (EP) .................................. 05425026

(51) Int. Cl.
*C01G 23/00* (2006.01)

(52) U.S. Cl. ........................... 423/85; 423/81; 423/386; 423/413; 423/610

(58) Field of Classification Search ................... 423/69, 423/81, 85, 386, 413, 610
See application file for complete search history.

(56) References Cited

U.S. PATENT DOCUMENTS 1,501,587 A 7/1924 Doremus
2,005,710 A 6/1935 Wilkins et al.
2,042,435 A * 5/1936 Svendsen ..................... 423/76
2,288,727 A * 7/1942 Mayer ......................... 423/81

(Continued)

FOREIGN PATENT DOCUMENTS

EP 0319857 A1 * 6/1989

(Continued)

OTHER PUBLICATIONS

International Search Report and Written Opinion dated Mar. 16, 2006 from the corresponding PCT/US2006/050214.

(Continued)

*Primary Examiner*—Melvin C Mayes
*Assistant Examiner*—Melissa Stalder
(74) *Attorney, Agent, or Firm*—Katten Muchin Rosenman LLP

(57) ABSTRACT

A process is described for the production of titanium dioxide by the treatment with ammonium fluoride of titanium ores containing iron; the process comprises the following steps: (a) the titanium ore containing iron is reacted with an aqueous $NH_4F$ and/or $NH_4HF_2$ solution; (b) the aqueous dispersion thus obtained is filtered with consequent separation of a solid residue and an aqueous solution containing titanium salts; (c) the aqueous solution thus obtained is subjected to hydrolysis, the hydrolysis comprising a first stage at pH 7.0-8.5 and a second stage at pH 10.0-13.0; (d) the aqueous dispersion thus obtained is filtered and the solid residue is subjected to pyrohydrolysis, the pyrohydrolysis comprising a first stage at a maximum temperature of 450° C. and a second stage at a maximum temperature of 1000° C.

52 Claims, 1 Drawing Sheet

U.S. PATENT DOCUMENTS

Figure 1:
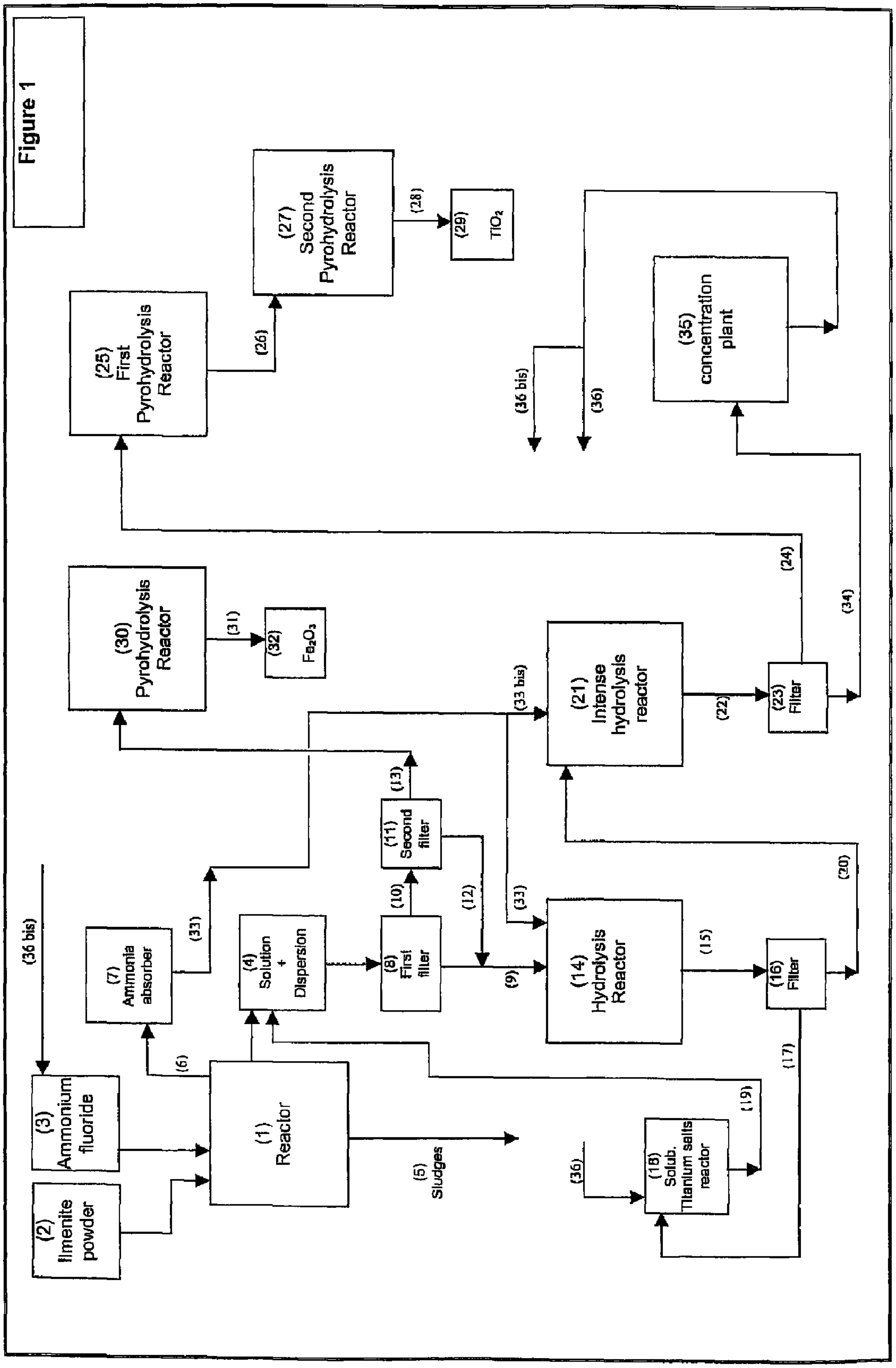

| | | | |
|---|---|---|---|
| 3,640,744 | A | 2/1972 | Dietz et al. |
| 4,107,264 | A | 8/1978 | Nagasubramanian et al. |
| 4,168,297 | A * | 9/1979 | Nagasubramanian et al. . 423/70 |
| 4,652,438 | A | 3/1987 | Folweiler |
| 4,803,056 | A | 2/1989 | Morris et al. |
| 5,397,375 | A * | 3/1995 | O'Donnell et al. ............ 75/368 |
| 2007/0196265 | A1 | 8/2007 | Gordienko |
| 2008/0044345 | A1 | 2/2008 | Gordienko |

FOREIGN PATENT DOCUMENTS

| | | | |
|---|---|---|---|
| GB | 2185248 | A | 12/1986 |
| JP | 57183325 | A | 11/1982 |
| RU | 2058408 | | 4/1996 |
| RU | 2144504 | | 1/2000 |
| WO | WO 0064815 | A1 * | 11/2000 |
| WO | WO 0114054 | A1 * | 3/2001 |
| WO | 2005/090235 | A | 9/2005 |

OTHER PUBLICATIONS

International Preliminary Examination Report dated Jun. 1, 2007 from the corresponding PCT/US2006/050214.

Office Action, mailed Oct. 20, 2008, in co-pending U.S. Appl. No. 10/593,243.

Office Action, mailed Oct. 15, 2008, in co-pending U.S. Appl. No. 11/852,431.

Office Action, mailed Mar. 19, 2009, in co-pending U.S. Appl. No. 11/852,431.

* cited by examiner (2) Ilmenite powder
(3) Ammonium fluoride
(1) Reactor
(5) Sludges
(6)
(7) Ammonia absorber
(33)
(4) Solution + Dispersion
(8) First filter
(9)
(10)
(11) Second filter
(12)
(13)
(14) Hydrolysis Reactor
(15)
(16) Filter
(17)
(18) Solub. Titanium salts reactor
(19)
(20)
(21) Intense hydrolysis reactor
(22)
(23) Filter
(24)
(25) First Pyrohydrolysis Reactor
(26)
(27) Second Pyrohydrolysis Reactor
(28)
(29) $TiO_2$
(30) Pyrohydrolysis Reactor
(31)
(32) $Fe_2O_3$
(33 bis)
(34)
(35) concentration plant
(36)
(36 bis)

PROCESS FOR THE PRODUCTION OF TITANIUM DIOXIDE USING AQUEOUS FLUORIDE

The present invention relates to a process for the production of titanium dioxide by the treatment with ammonium fluoride of titanium ores containing iron, comprising the following steps:

(a) the titanium ore containing iron is reacted with an aqueous $NH_4F$ and/or $NH_4HF_2$ solution;

(b) the aqueous dispersion thus obtained is filtered with consequent separation of a solid residue and an aqueous solution containing titanium salts;

(c) the aqueous solution thus obtained is subjected to hydrolysis, the hydrolysis comprising a first stage at pH 7.0-8.5 and a second stage at pH 10.0-13.0;

(d) the aqueous dispersion thus obtained is filtered and the solid residue is subjected to pyrohydrolysis, the pyrohydrolysis comprising a first stage at a maximum temperature of 450° C. and a second stage at a maximum temperature of 1000° C.

STATE OF THE ART

Titanium dioxide is a white pigment which is used to a large extent in industry and is normally obtained by the processing of titanium ores such as, for example, ilmenite. Iron is the principal impurity of titanium ores; the primary objective of the processes known in the art is consequently to achieve the greatest degree of separation of titanium and iron at the lowest cost.

U.S. Pat. No. 4,168,297 describes a process for the separation of iron from titanium in fluoride solution by leaching which consists of the extraction of the iron (III) with alkylphosphoric acids; this process leads to the production of titanium dioxide which is not sufficiently pure; it is also expensive, complex and hazardous to the environment.

Russian patent No. 2144504 describes a process which provides for the precipitation of iron fluoride at a pH of between 4 and 8 and Russian patent No. 2182886 describes a process in which the precipitation takes place at a pH of between 6.0 and 7.5.

A process for the separation of iron from titanium based on their different solubilities in ammonium fluoride solution is described in U.S. Pat. No. 4,107,264, in which the iron is precipitated as ammonium fluoroferrate at a pH of between 6.0 and 6.8.

Russian patent No. 2058408 describes a method of separating iron from titanium by leaching of the raw material by fusion with ammonium hydrofluoride at a temperature of 50-180° C.

U.S. Pat. No. 2,042,435 describes a process for the separation of iron from titanium in fluoride solutions which provides for the treatment of the ore with an aqueous solution of ammonium fluoride compounds at temperatures of 140-150° C., followed by distillation to give a solid residue; the solid residue is then dissolved in hot water or in ammonium fluoride solution; the resulting ammonium fluoroferrates remain in the solid residue whilst the fluorotitanates pass into solution; the solution is filtered and neutralized and the remaining iron particles are removed by treating the solution thus obtained with a soluble sulphide.

However the above-mentioned processes produce titanium dioxide having unsatisfactory purity, stability and/or particle size; they are also very expensive and lead to the production of by-products which must be disposed of.

DESCRIPTION OF THE INVENTION

The process according to the present invention has considerable advantages over the processes known in the art:

- the titanium dioxide which is obtained by this process is 6-7 times more stable with respect to irradiation with UV rays than the product that is currently available commercially and produced by conventional processes; it can therefore be used to produce products with a white colour which is durable over time;
- the titanium dioxide thus obtained has a particle size of 0.1-4.0 μm which can therefore be marketed without further milling treatments;
- the process does not produce waste by-products; the ammonia which is evolved can in fact be recycled as can the ammonium fluoride; the iron content of the starting ore, on the other hand, is isolated as $Fe_2O_3$ which in turn is a red pigment that is of commercial interest;
- the process, again compared with conventional processes, requires less energy expenditure.

The extraction process according to the present invention starts with the extraction of the titanium from the ilmenite ore ($FeTiO_3$), which may optionally be enriched; this extraction takes place in a suitable reactor by reacting the ore with a concentrated aqueous solution (from 40 to 60% by weight, preferably about 50%) of ammonium fluoride ($NH_4F$) and/or $NH_4HF_2$.

The ore is introduced into the reactor in the form of sand with an average particle size of 0.05-1.5 mm, preferably about 0.1 mm, and may be preheated to 80-120° C., preferably to about 100° C. It is advisable to admit the sand to the base of the reactor with a system which prevents the gases that are present in the reactor from going back through the sand-input duct. The aqueous ammonium fluoride ($NH_4F$) and/or $NH_4HF_2$ solution is also preferably introduced at the base of the reactor and may be preheated to 80-120° C., preferably to about 100° C.; the ratio by weight between ilmenite and $NH_4F$ and/or $NH_4HF_2$ solution is normally between 1:1.5 and 1:3 and is preferably about 1:2.

The reactor is provided with an apparatus for stirring the ilmenite sand so as to promote intimate contact between the reagents (ilmenite and solution), particularly in the lower region of the reactor. The stirring may be such as not to create turbulent motion in the upper portion of the reactor; in the most preferred embodiment, the stirring speed should not exceed 20 revolutions/minute, preferably 10 revolutions/minute.

The temperature in the reactor is kept at 100-120° C., preferably about 108° C., and a pressure of between about 1 and 2 bar is maintained; this can be achieved by conventional devices known in the art, for example, by a jacket heating system outside the reactor; in the most preferred embodiment, most of the heat is transmitted through the lower portion of the reactor where the concentration of the reagents is greatest; moreover, to prevent leakage of gaseous compounds into the outside environment, it is advisable to use a leaktight reactor. The reaction has a preferred duration of 40 to 80 minutes.

The pH inside the reactor in these operative conditions is about 6.5-7.0.

Gaseous ammonia is evolved by the reaction; this can be conveyed out of the reactor and absorbed in water to give a concentrated solution (about 24% by weight) of ammonium hydroxide $NH_4OH$ which in turn can be used in the subsequent stages of hydrolysis of the titanium salts. The removal of the ammonia also enables the pressure inside the reactor to be regulated (normally to about 1 bar).

The reaction between $FeTiO_3$ and $NH_4F$ and/or $NH_4HF_2$ (in aqueous solution) produces two salts: titanium ammonium hexafluoride $(NH_4)_2TiF_6$ and iron (ferric) ammonium hexafluoride $(NH_4)_3FeF_6$. The titanium salt has a solubility which is directly dependent on the temperature and inversely dependent on the concentration of $NH_4F$ and/or $NH_4HF_2$; it therefore remains in solution in the reaction conditions. The iron salt on the other hand has negligible solubility and remains in the form of a solid dispersion.

An aqueous solution of the salts $NH_4F$ and $(NH_4)_2TiF_6$, containing the dispersion of the salt $(NH_4)_3FeF_6$ is recovered from the reactor; the concentration of $NH_4F$ is normally 20-35% by weight, preferably about 25-30%, which corresponds to the maximum concentration of the titanium salt in solution which, in these conditions, is about 9-11% by weight and in any case does not exceed 12% by weight.

The dispersion output from the reactor is passed through a filter which can retain solid particles with dimensions of between 0.1 and 2.0 μm; this result can be achieved with meshes having 2-3 nm holes, preferably about 2.5 nm holes. The solid dispersion of the iron salt is separated from the titanium salt solution in this section.

The filtered sludge can be washed further with $NH_4F$ solution and then filtered a second time; these two filtrations may take place in the same filtering apparatus.

The filtration provides as outputs:

(a) a sludgy solid portion containing the iron salt $(NH_4)_3FeF_6$ and ammonium fluoride $(NH_4F)$;

(b) an aqueous solution containing the titanium salt $(NH_4)_2TiF_6$, ammonium fluoride $(NH_4F)$, and traces of the iron salt $(NH_4)_3FeF_6$ which represents the contaminant of the final product.

The sludgy solid portion (a) normally has a moisture content of between 10 and 20% by weight, depending on the filtering device used. The aqueous solution (b) normally has an iron salt $(NH_4)_3FeF_6$ content of about 0.04-0.06% by weight.

The aqueous solution (b) output from the filtration stage is then further purified of the iron salt $(NH_4)_3FeF_6$ with the objective of reducing the concentration thereof to below 0.01% by weight, preferably below 0.001% (understood as the concentration of the iron salt).

This takes place by shifting the pH of the solution to 7.0-8.5, preferably 7.5-8.0 by the addition of concentrated ammonium hydroxide $(NH_4OH)$ (about 24% by weight); this operation causes the formation of an insoluble ammonium oxyfluorotitanate $[(NH4)_3TiOF_5]$ which precipitates, incorporating the residual iron salt $(NH_4)_3FeF_6$ (and is in fact a chemical filtration.

The operation is performed in a reactor at a temperature of 50-70° C., preferably about 60° C., with stirring; the stirring speed is normally 40-90 revolutions/minute, preferably about 50 revolutions/minute; the quantity of $NH_4OH$ to be added is normally a large excess with respect to the quantity required by the reaction and is regulated by regulating the pH in the stream output from the container to the preferred value of 7.5-8.0.

The dispersion is filtered to give an aqueous solution of the titanium salt $(NH_4)_2TiF_6$, further purified of the compounds containing iron, and a sludge containing the titanium complex and the iron salt $(NH_4)_3FeF_6$.

The sludge can be re-dissolved in a further container provided with stirring, by acidification; this takes place by the addition of a concentrated solution of $NH_4F$ and/or optionally $NH_4HF_2$ (about 40-50% by weight) to a pH of about 6.5-7.0; the titanium salt thus becomes soluble again forming $(NH_4)_2TiF_6$. The solution/dispersion thus obtained is then recirculated in addition to the output flow from the main reactor. This solution/dispersion contains both the soluble titanium salt $(NH_4)_2TiF_6$ and the insoluble iron salt $(NH_4)_3FeF_6$ which was incorporated by ammonium oxyfluorotitanate during its precipitation. This allows the complete recovery of both metals without producing wastes.

The purified solution, which contains the titanium salt $(NH_4)_2TiF_6$, $NH_4F$, and water, is then subjected to intense hydrolysis to give a sludge containing titanium complexes and to a subsequent high-temperature pyrohydrolysis. This method of operation enables smaller apparatuses to be used in the high-temperature stages than would be necessary for processing the untreated solution.

The intense hydrolysis is performed in a reactor provided with stirring (approximately 10 revolutions/minute), whilst a temperature of 50-70° C., preferably about 60° C., is maintained. The reaction is brought about by bringing the pH of the solution to very high values, preferably of 10-13, even more preferably of about 11-12 (monitored on the stream output from the reactor); this result is obtained by the addition of a concentrated ammonium hydroxide $NH_4OH$ solution (about 24% by weight); this ammonium hydroxide solution is preferably used with a large excess with respect to the quantity required by the reaction.

The hydrolysis brings about the precipitation of a mixture of titanium salts and oxides $(NH_4)_2TiOF_4$+$(NH_4)_3TiOF_5$+$TiO_2$ in the form of particles having a size of about 0.01 μm. An aqueous solution of $NH_4F$ with a solid composed of salts that can be filtered is thus created in the hydrolysis reactor.

The dispersion thus obtained is then filtered through an extremely fine-mesh filter (2-3 nm, preferably about 2.5 nm); the solution which emerges from the filter, containing $NH_4F$, water, and traces of titanium salts, can be recirculated and reused to fill the reactor, normally after concentration to 40-45% by weight.

The sludgy portion output from the filter, which normally has a moisture content of between 10 and 20% by weight, depending on the filtering device, is subjected to a pyrohydrolysis process. The process is divided into two stages to be performed in two separate ovens.

Ist stage: after drying to eliminate the water, the sludge containing the titanium salts undergoes a first hot hydrolysis at a maximum temperature of 450° C., preferably at 340-400° C., even more preferably at about 360-380° C., for a period of 1-3 hours, preferably about 2 hours; this normally takes place in an oven in an atmosphere of superheated steam and with continuous remixing. In these conditions, all of the fluoroammonia bonds are broken, giving an intermediate product in powder form constituted by $TiO_2$ (95-97%) and $TiOF_2$. The gaseous compounds extracted from the oven, containing $NH_3$, HF, and $H_2O$, are normally cooled and absorbed in water to give a concentrated solution of $NH_4F$ which can be recirculated and reused to fill the reactor. It is advisable not to cool the gases below 200° C. prior to the absorption in water, to prevent the formation of $NH_4HF_2$ crystals, resulting in blockage of the tubing.

IInd stage: the first stage produces $TiO_2$ containing traces of $TiOF_2$ which is a grey-blue powder and is therefore a contaminant for the final product $TiO_2$ which instead must be characterized by a high degree of whiteness. This contaminant is eliminated by subsequent pyrohydrolysis at a temperature no greater than 1000° C., preferably 700-900° C., even more preferably 750-850° C., that is, about 800° C. This second pyrohydrolysis is normally performed in an oven with continuous stirring, for 60-180 minutes, preferably for about 90-120 minutes. For the completion of the reaction, it is advisable to admit air and superheated steam to the oven. Gases at high temperature containing substantially water, air and a few parts by weight of hydrofluoric acid (HF) will also be output from this oven and can be added to those from the preceding oven for the extraction and washing stage. The reaction gases which emerge from the second oven normally represent only 5% of the total gases coming from the two ovens.

In addition to the main reaction, the first pyrohydrolysis oven must ensure the complete elimination of the ammonia compounds from the solid product which will undergo the subsequent high-temperature pyrolysis stage in the second oven. In fact the high temperature (about 800° C.) of the second oven would cause probable splitting-up of any $NH_3$ which had not been eliminated into nitrogen $N_2$ and hydrogen $H_2$ with the consequent risk of the creation of explosive gas mixtures.

With reference to the above-described pyrohydrolysis process performed in the two ovens arranged in series, it is worth mentioning that:

- the sludge input to the first pyrolysis oven is composed of particles with sizes of about 0.01 μm;
- the particles of the dust output from the first oven have sizes of about 0.1-2.5 μm;
- the product output from the second oven is constituted by a dust with particles of sizes variable from about 0.1 μm to about 4 μm, depending on the time spent in the oven.

Given the particular fineness of the $TiO_2$ dust thus obtained, it can be marketed without the further milling treatments which are necessary in the processes for the transformation of ilmenite into titanium dioxide that are known in the art.

The solid-sludgy portion which is output from the main filtration and contains the iron salt $(NH_4)_3FeF_6$ and ammonium fluoride ($NH_4F$) and which normally has a moisture content of between 10 and 20% by weight may be subjected, after a first drying stage, to a similar pyrohydrolysis process in a single oven to give a red $Fe_2O_3$ pigment which in turn can be marketed. This pyrolysis can be performed at a maximum temperature of 450° C., preferably at 340-400° C., even more preferably at about 360-380° C. for about 2-4 hours, preferably 3 hours, in an atmosphere of superheated steam with a continuous remixing action.

The gases evolved from this reaction, containing $NH_3$, HF, $H_2O$, can also be recirculated and reused to fill the reactor after suitable cooling and absorption in water to give a concentrated $NH_4F$ solution.

Naturally, the materials used in the three ovens must be such as to withstand the working temperatures and, in particular, the common presence of hydrofluoric acid HF in the gaseous phase. Similarly, all of the elements making up the plant to be used for the process of the invention must be made of materials which can withstand the effects of hydrofluoric acid.

FIG. 1 is a block diagram which shows the preferred implementation of the process as a whole.

DETAILED DESCRIPTION OF THE PROCESS

The reactor (1) is connected to a container (2) for the ilmenite dust and to a container (3) for the ammonium fluoride. Also indicated are the outputs of the iron salt dispersion/titanium salt solution (4), of the sludges (5), and of the gas (6) from the reactor (1), as well as an absorber (7) for the ammonia, in which the aqueous $NH_4OH$ solution is produced.

The iron salt dispersion/titanium salt solution (4) is sent to a first filter (8) with a filtrate output (9) and a sludge output (10); the sludge (10) can be sent to a second filter (11) with a filtrate output (12) and a sludge output (13) or directly to the pyrohydrolysis reactor (30) for producing $Fe_2O_3$.

The filtrate (9), with which the filtrate (12) may be combined, is sent to the hydrolysis reactor (14); the stream (15) output from the hydrolysis reactor (14) is sent to a filter (16) provided with a sludge output (17) connected to a reactor for solubilizing the titanium salts (18) which are then recirculated through the line (19). The filtrate output from the filter (16) is sent through the line (20) to the intense hydrolysis reactor (21), the discharge (22) of which is connected to a filter (23) by means of which the sludge containing the mixture of titanium salts and oxides $(NH_4)_2TiOF_4$+$(NH_4)_3TiOF_5$+$TiO_2$ is recovered.

This sludge is sent through the line (24) to a first pyrohydrolysis reactor (25) which is connected by the line (26) to a second pyrohydrolysis reactor (27) with an output (28) communicating with a container (29) for the storage of the $TiO_2$ powder.

The aqueous $NH_4OH$ solution formed in the ammonia absorber (7) can be sent to the hydrolysis reactors (14) and (21) through the lines (33) and (**33*bis*), respectively. The solution (34) output from the filter (23), containing $NH_4F$, water, and traces of titanium salts, is sent to the concentration plant (35) and is then recirculated to the reactor for the solubilization of the titanium salts (18) and to the ammonium fluoride container (3) through the lines (36) and (36*bis***), respectively.

The invention claimed is:

1. A process for the production of titanium dioxide comprising the following steps:

(a) reacting a titanium ore containing iron with an aqueous $NH_4F$ and/or $NH_4HF_2$ solution to produce an aqueous dispersion containing $(NH_4)_2TiF_6$ and $(NH_4)_3FeF_6$;

(b) filtering the aqueous dispersion thus obtained with consequent separation of a solid residue and an aqueous solution containing titanium salts;

(c) subjecting the aqueous solution thus obtained to hydrolysis, the hydrolysis comprising a first stage at pH 7.0-8.5, wherein the dispersion obtained from the first stage of the hydrolysis (c) is filtered to give an aqueous solution containing the titanium salt $(NH_4)_2TiF_6$ and having a $(NH_4)_3FeF_6$ concentration lower than 0.01% by weight, and a sludge fraction containing ammonium oxyfluorotitanate and $(NH_4)_3FeF_6$, and wherein said aqueous solution from the first stage is subjected to a second stage at pH 10.0-13.0;

(d) filtering the aqueous dispersion thus obtained and the solid residue is subjected to pyrohydrolysis, the pyrohydrolysis comprising a first stage at a maximum temperature of 450° C. and a second stage at a maximum temperature of 1000° C.

2. A process according to claim 1, wherein step (a) is performed at 100-120° C.

3. A process according to claim 1, wherein step (a) is performed at a pressure of about 1-2 bar.

4. A process according to claim 1 wherein step (a) is performed at a pH of about 6.5-7.0.

5. A process according to claim 1, wherein step (a) has a duration of 40 to 80 minutes.

6. A process according to claim 1, wherein the aqueous $NH_4F$ and/or $NH_4HF_2$ solution of step (a) has a concentration of 30-60% by weight.

7. A process according to claim 1, wherein the filtration of step (b) and/or step (d) is performed with meshes having 2-3 nm holes.

8. A process according to claim 1, wherein the hydrolysis (c) is performed by the addition of an ammonium hydroxide solution.

9. A process according to claim 1, wherein the hydrolysis (c) is performed with stirring, the first stage at a speed of 40-60 revolutions/minute, the second stage at about 10 revolutions/minute.

10. A process according to claim 1, wherein the first stage of the hydrolysis (c) is performed at a pH of about 7.5-8.0.

11. A process according to claim 1, wherein the second stage of the hydrolysis (c) is performed at a pH of about 11-12.

12. A process according to claim 1, further comprising dissolving said sludge fraction from step (c) and directing said dissolved sludge fraction to step (b).

13. A process according to claim 1, wherein the first stage of the pyrohydrolysis (d) is performed at 340-400° C.

14. A process according to claim 1, wherein the first stage of the pyrohydrolysis (d) is performed at 360-380° C.

15. A process according to claim 1, wherein the first stage of the pyrohydrolysis (d) is performed for 1-3 hours.

16. A process according to claim 1, wherein the second stage of the pyrohydrolysis (d) is performed at 700-900° C.

17. A process according to claim 1, wherein the second stage of the pyrohydrolysis (d) is performed at 750-850° C.

18. A process according to claim 1, wherein the second stage of the pyrohydrolysis (d) is performed for 60-180 minutes.

19. A process according to claim 1, wherein the solid residue of step (b) is subjected to pyrohydrolysis at a maximum temperature of 450° C.

20. A process according to claim 1, wherein the solid residue of step (b) is subjected to pyrohydrolysis at 360-380° C.

21. A process according to claim 19, wherein the pyrohydrolysis is performed for 2-4 hours.

22. A process according to claim 1, wherein the titanium ore containing iron is ilmenite, with an average particle size of 0.05-1.5 mm.

23. A process according to claim 1, wherein the pyrohydrolysis reaction (d) is performed in the presence of steam.

24. A process according to claim 1, is produced in step (a) and where said ammonia is used in step (c).

25. A process according to claim 1, wherein the second stage of the pyrohydrolysis (d) is performed for 90-120 minutes.

26. A process according to claim 1, wherein the solid residue of step (b) is subjected to pyrohydrolysis at 340-400° C.

27. A process for the production of titanium dioxide comprising the following steps:

(a) reacting a titanium ore containing iron with an aqueous $NH_4F$ and/or $NH_4HF_2$ solution to produce an aqueous dispersion consisting essentially of water, unreacted $NH_4F$ and/or $NH_4HF_2$, $(NH_4)_2TiF_6$ and $(NH_4)_3FeF_6$;

(b) filtering the aqueous dispersion thus obtained with consequent separation of a solid residue and an aqueous solution containing titanium salts;

(c) subjecting the aqueous solution thus obtained to hydrolysis, the hydrolysis comprising a first stage at pH 7.0-8.5, wherein the dispersion obtained from the first stage of the hydrolysis (c) is filtered to give an aqueous solution containing the titanium salt $(NH_4)_2TiF_6$ and having a $(NH_4)_3FeF_6$ concentration lower than 0.01% by weight, and a sludge fraction containing ammonium oxyfluorotitanate and $(NH_4)_3FeF_6$, and wherein said aqueous solution from the first stage is subjected to a second stage at pH 10.0-13.0;

(d) filtering the aqueous dispersion thus obtained and the solid residue is subjected to pyrohydrolysis, the pyrohydrolysis comprising a first stage at a maximum temperature of 450° C. and a second stage at a maximum temperature of 1000° C.

28. A process according to claim 27, wherein step (a) is performed at 100-120° C.

29. A process according to claim 27, wherein step (a) is performed at a pressure of about 1-2 bar.

30. A process according to claim 27, wherein step (a) is performed at a pH of about 6.5-7.0.

31. A process according to claim 27, wherein step (a) has a duration of 40 to 80 minutes.

32. A process according to claim 27, wherein the aqueous dispersion of step (a) has a concentration of 30-60% by weight.

33. A process according to claim 27, wherein the filtration of step (b) and/or step (d) is performed with meshes having 2-3 nm holes.

34. A process according to claim 27, wherein the hydrolysis (c) is performed by the addition of an ammonium hydroxide solution.

35. A process according to claim 27, wherein the hydrolysis (c) is performed with stirring, the first stage at a speed of 40-60 revolutions/minute, the second stage at about 10 revolutions/minute.

36. A process according to claim 27, wherein the first stage of the hydrolysis (c) is performed at a pH of about 7.5-8.0.

37. A process according to claim 27, wherein the second stage of the hydrolysis (c) is performed at a pH of about 11-12.

38. A process according to claim 27, further comprising dissolving said sludge fraction from step (c) and directing said dissolved sludge fraction to step (b).

39. A process according to claim 27, wherein the first stage of the pyrohydrolysis (d) is performed at 340-400° C.

40. A process according to claim 27, wherein the first stage of the pyrohydrolysis (d) is performed at 360-380° C.

41. A process according to claim 27, wherein the first stage of the pyrohydrolysis (d) is performed for 1-3 hours.

42. A process according to claim 27, wherein the second stage of the pyrohydrolysis (d) is performed at 700-900° C.

43. A process according to claim 27, wherein the second stage of the pyrohydrolysis (d) is performed at 750-850° C.

44. A process according to claim 27, wherein the second stage of the pyrohydrolysis (d) is performed for 60-180 minutes.

45. A process according to claim 27, wherein the solid residue of step (b) is subjected to pyrohydrolysis at a maximum temperature of 450° C.

46. A process according to claim 27, wherein the solid residue of step (b) is subjected to pyrohydrolysis at 360-380° C.

47. A process according to claim 27, wherein the pyrohydrolysis is performed for 2-4 hours.

48. A process according to claim 27, wherein the titanium ore containing iron is ilmenite, with an average particle size of 0.05-1.5 mm.

49. A process according to claim 27, wherein the pyrohydrolysis reaction (d) is performed in the presence of steam.

50. A process according to claim 27, wherein ammonia is produced in step (a) and where said ammonia is used in step (c).

51. A process according to claim 27, wherein the second stage of the pyrohydrolysis (d) is performed for 90-120 minutes.

52. A process according to claim 27, wherein the solid residue of step (b) is subjected to pyrohydrolysis at 340-400° C.

* * * * *